United States Patent [19]

Haas

[11] Patent Number: 4,792,763
[45] Date of Patent: Dec. 20, 1988

[54] HOT CATHODE IONIZATION PRESSURE GAUGE

[75] Inventor: Günther Haas, Garching, Fed. Rep. of Germany

[73] Assignee: Max-Planck-Gesellschaft Zur Foerderung Der Wissenschaften e.V., Fed. Rep. of Germany

[21] Appl. No.: 72,672

[22] Filed: Jul. 13, 1987

[30] Foreign Application Priority Data

Aug. 25, 1986 [DE] Fed. Rep. of Germany ....... 3628847

[51] Int. Cl.$^4$ ............................................. G01L 21/32
[52] U.S. Cl. .................................... 324/462; 313/632; 324/460
[58] Field of Search ............... 324/460, 462, 463, 464, 324/470; 250/426, 427, 379, 382; 313/629, 632, 341, 344

[56] References Cited

U.S. PATENT DOCUMENTS

| | | | |
|---|---|---|---|
| 2,334,356 | 11/1943 | Salzberg et al. | 324/462 |
| 2,516,704 | 7/1950 | Kohl | 324/462 |
| 3,274,436 | 9/1966 | Reich | 324/462 |
| 4,095,133 | 6/1978 | Hoeberechts | 313/351 |

Primary Examiner—Reinhard J. Eisenzopf
Assistant Examiner—Anthony L. Miele
Attorney, Agent, or Firm—Henry C. Nields

[57] ABSTRACT

A hot cathode ionization gauge with which neutral gas densities in the range $10^{17}$ to $10^{21}$m$^{-3}$ can be measured, in particular under the conditions typical of fusion-orientated plasma experiments (magnetic field strength from 0 to more than 3 tesla, magnetic field direction varying by up to +/−20 degrees or more and strong plasma-induced noise background), and which is of robust design, reliable in operation and very compact and has a high sensitivity which depends in a reproducible manner on the magnetic field strength and is independent, in a certain degree which is predetermined and can be influenced by the construction, of the field direction and, within a wide range, of the gas density comprises the following electrodes arranged in mutually spaced relationship in the stated order along an axis: a cathode consisting of a tungsten wire at least 0.5 mm thick and which has a middle, active portion, a plane control electrode of diaphragm form arranged at a close distance from and parallel to the active portion of the cathode and having an elongated opening with which the active portion of the cathode is in alignment, a plane accelerating electrode arranged at a distance from and parallel to the control electrode and having a series of parallel slit-shaped apertures extending perpendicularly to the longitudinal direction of the active cathode portion, and a plane, plate-shaped ion collector electrode parallel to the control electrode.

18 Claims, 4 Drawing Sheets

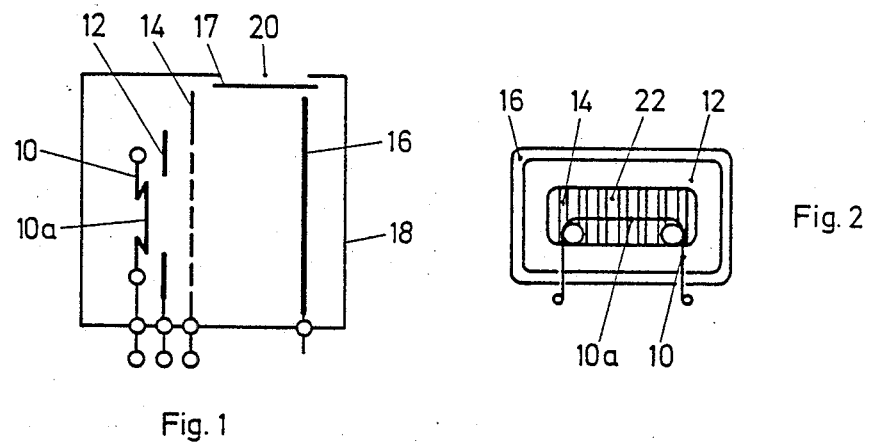
Fig. 1
Fig. 2
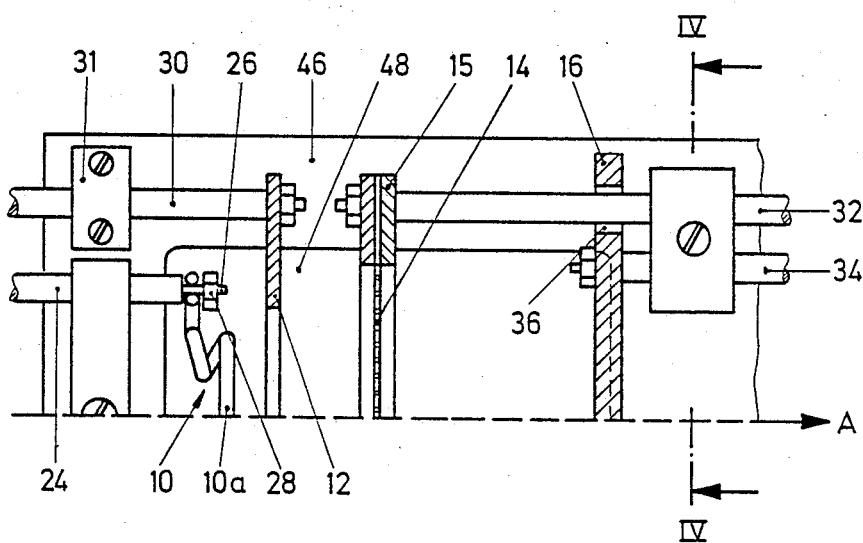
Fig. 3
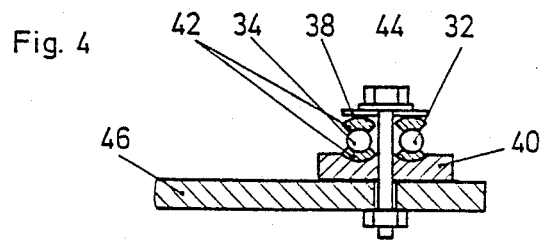
Fig. 4

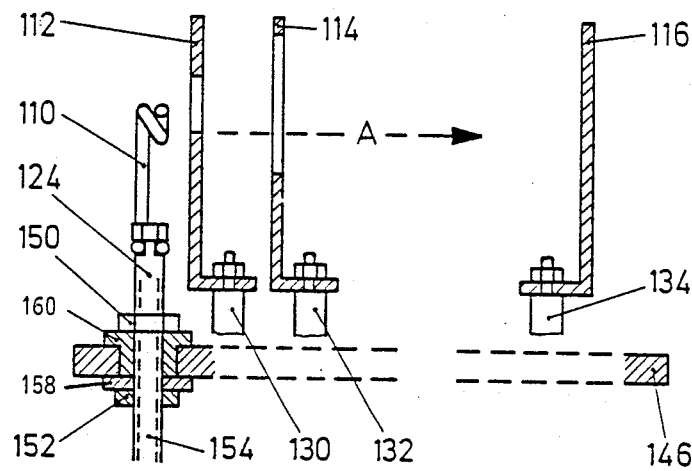
Fig. 5
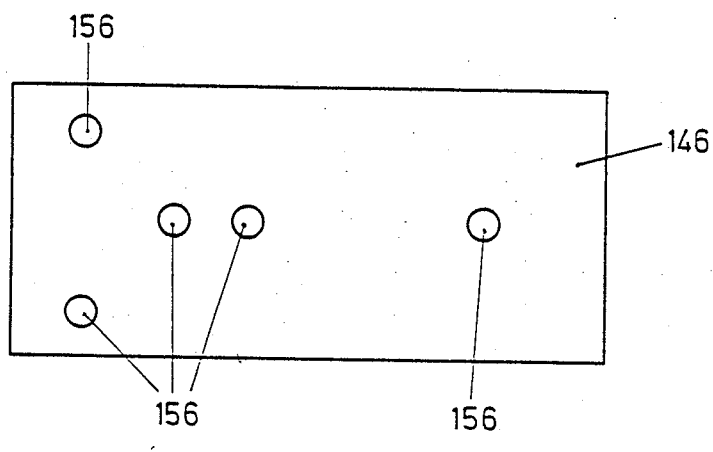
Fig. 6
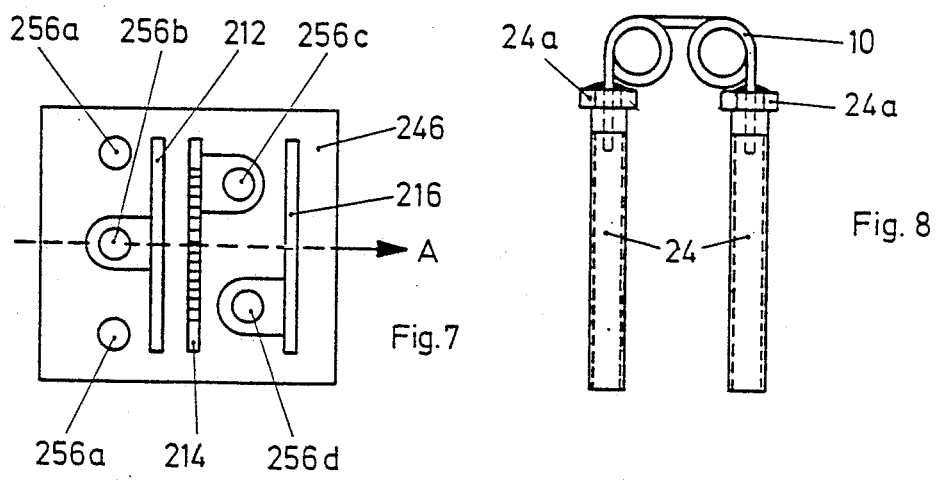
Fig. 7
Fig. 8

HOT CATHODE IONIZATION PRESSURE GAUGE

BACKGROUND OF THE INVENTION

1. Field of the Invention:

The present invention relates to apparatus for measuring low gas pressure or density, more specifically to a hot cathode ionization pressure gauge or manometer.

2. Description of the Prior Art:

For the purpose of measuring neutral gas density in the presence of strong magnetic fields and a high noise background, such as prevail, for example, in plasma-physical apparatus and fusion experiments, it is known to employ a hot cathode ionization gauge containing a linear triode system with a cathode consisting of a relatively thick (0.6 mm) thoriated tungsten wire, an accelerating grid and a relatively large ion collector which are arranged along an axis at a distance from one another. The axis of the triode system is arranged substantially parallel to the magnetic field, which forces the electrons emitted by the cathode and accelerated by the accelerating grid onto paths which extend along the lines of the magnetic field (Journal of Nuclear Matrials 121 (1984) 151–156). There is known from Journal of Physics E: Scientific Instruments 1974, Vol. 7, pp. 453–457, a hot cathode ionization gauge with a linear electrode system which is surrounded by a plasma shield consisting of a series of spaced, annular plates surrounding the electrode system, which is arranged between two closed end plates.

From Rev. Sci. Instr. 34, No. 8, pp. 942–943, August 1963, there is known a hot cathode ionization gauge with a linear electrode system comprising, in the stated sequence, a plate-shaped collector electrode, a plane screen grid, a helical cathode, a plane modulating grid and a plate-shaped anode. The modulating grid allows the stream of electrons flowing from the cathode to the anode to be interrupted periodically. The grids consist of a tungsten gauze. This and the arrangement of the anode and collector electrode on opposite sides of the cathode (Schulz-Phelps arrangement) make one expect a considerable dependence of the sensitivity on the direction of the magnetic field. Chopping of the emission current of a hot cathode ionization gauge is known from J. Vac. Sci. Technol., Vol. 18, No. 3, April 1981, pp. 1017–1022.

SUMMARY OF THE INVENTION

It is an object of the invention to provide a hot cathode ionization gauge with which neutral gas densities in the range of, e. g. $10^{17}$ to $10^{21}$ m$^{-3}$ can be measured, in particular under the conditions typical of fusion-orientated plasma experiments (magnetic field strength frame 0 to more than 3 tesla, magnetic field direction varying by up to $+/-20$ degrees or more and strong plasma-induced noise background), and which is of robust design which is reliable in operation and, if desired, very compact and has a high sensitivity which depends in a reproducible manner on the magnetic field strength and is independent, in a certain degree which is predetermined and can be influenced by the construction, of the field direction and, within a wide range, of the gas density.

According to a preferred embodiment of the invention, a hot cathode ionization gauge comprises the following electrodes arranged in mutually spaced relationship in the order named along an axis:

(a) a cathode consisting of a tungsten wire at least 0.5 mm thick and which has a middle, active portion, (b) a plane control electrode of diaphragm form arranged at a close distance from and parallel to the active portion of the cathode and having an elongated opening with which the active portion of the cathode is in alignment, (c) a plane accelerating electrode arranged at a distance from and parallel to the control electrode and having a series of parallel slit-shaped apertures extending perpendicularly to the longitudinal direction of the active cathode portion, and (d) a plane, plate-shaped ion collector electrode parallel to the control electrode.

Preferably the electrodes are arranged in a box-shaped plasma shield having a gas inlet opening.

Alternatively, the electrodes may be enclosed in a shielding arrangement open at the side which includes a series of parallel annular shielding electrodes spaced along the axis and a terminal plate at both ends.

Further objects, features and benefits of the invention will become apparent to those skilled in the art upon reading the following description with the drawings.

BRIEF DESCRIPTION OF THE DRAWINGS

FIG. 1 is a diagrammatic representation of a hot cathode ionization gauge according to an embodiment of the invention;

FIG. 2 is a simplified view of the electrode system of the ionization gauge according to FIG. 1 from the cathode towards the ion collector electrode;

FIG. 3 is a plan view of a part of another practical embodiment of the ionization gauge according to the invention;

FIG. 4 is a section in a plane IV—IV of FIG. 3;

FIG. 5 is a simplified side view of a further embodiment of the invention;

FIG. 6 is a plan view of a base plate of the ionization gauge according to FIG. 5;

FIG. 7 is a simplified plan view of a preferred embodiment of the invention of particularly compact construction;

FIG. 8 shows an alternative cathode design;

DESCRIPTION OF PREFERRED EMBODIMENTS

Figure 9:
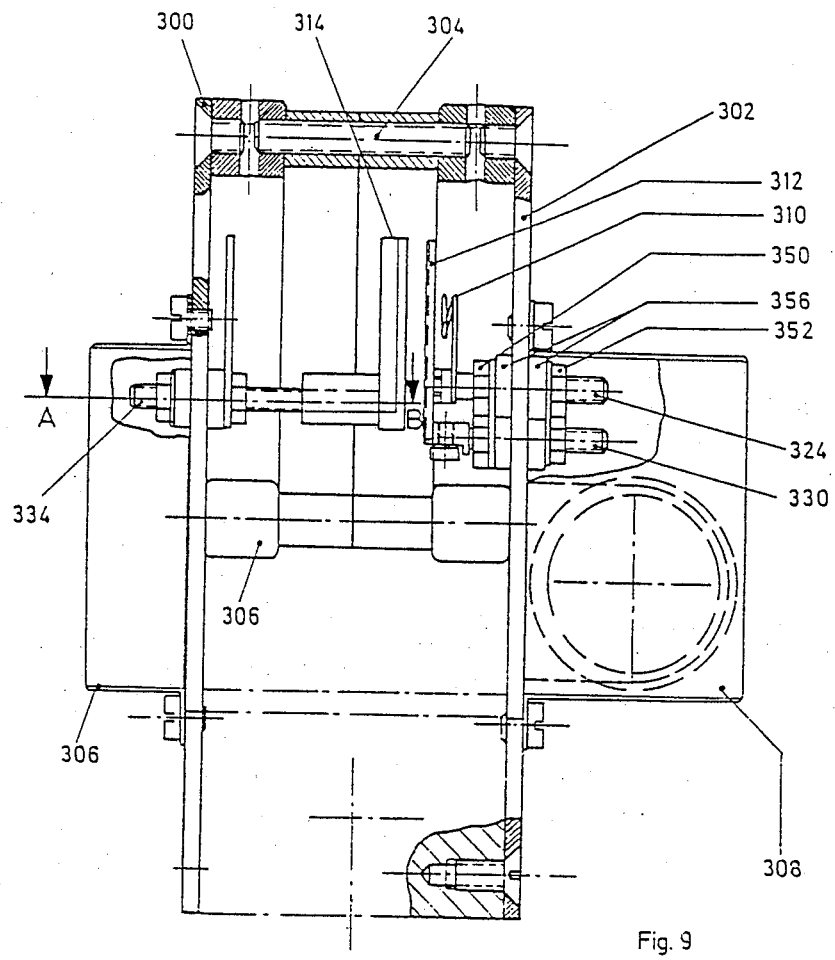
FIG. 9 is a side view, partly in section, of another preferred embodiment of the invention.

The hot cathode ionization gauge shown diagrammatically in FIGS. 1 and 2 contains a cathode 10 heated in operation by direct current and consisting of relatively thick (preferably at least 0.5 mm, e.g. 0.6 mm), preferably thoriated tungsten wire, and moreover a control electrode 12 of diaphragm form arranged close to the cathode, an accelerating electrode 14 having slit-shaped apertures and an ion collector electrode 16, which are arranged substantially parallel to one another in the stated sequence along an axis and form a linear tetrode electrode system.

The electrode system is arranged in a substantially closed, box-shaped plasma shield 18 which has a gas inlet opening 20 and serves for thermalizing the incoming gas molecules. For improved thermalization, a baffle plate 17 may be arranged at a distance behind the gas inlet opening 20. Alternatively, the shield may also include a series of annular plates spaced in the axial direction and a closed terminal plate at both ends, as is known from Journal of Physics E: Scientific Instruments, Vol. 7, 1974, p. 453.

As shown in FIG. 2, the cathode 10 is approximately U-shaped and forms two annular loops which insulate the straight, middle, active emitting portion 10a of the cathode wire thermally from the ends attached to holding and current-carrying rods. The control electrode 12 is a component part of diaphragm form with a hole having the shape of an elongated rectangle whose longitudinal direction extends parallel to the straight, middle active portion 10a of the cathode. The accelerating electrode 14 preferably consists of a thin molybdenum foil with slits 22 extending perpendicularly to the direction of the active cathode portion 10a and giving a transparency of about 80% in the operative part in line with the opening of the control electrode 12.

In practice, the ionization gauge according to FIGS. 1 and 2 may be constructed as shown in FIGS. 3 and 4. For the sake of simplicity, only one half of the ionization gauge is shown in FIG. 3; as regards the cathode and its holder, the other half is a mirror image with respect to the dash-line axis (A).

The wire forming the cathode 10 has at each of its ends an eye by which it is attached to a holding rod 24, which serves at the same time as an electric lead. The holding rod 24 terminates in threaded pin 26 which has a smaller diameter than the main portion of the holding rod 24. The eye at the respective end of the cathode wire is forced against the end face of the main portion of the holding rod 24 by a nut 28 screwed onto the threaded pin, which ensures mechanically secure retention and good electrical contact and renders simple exchange of the cathode 10 possible. As shown in FIG. 8, the cathode wire 10 may also be brazed into axial bores in the holding rods, which consist, for example, of molybdenum, by means of a high-melting brazing material (e. g. Au-Ni, m.p. about 950°), which has certain advantages as regards manufacturing technique. In the same operation, a flange 24a with a spanner chamfering (similarly to a screw nut and in substitution for such a nut) may be brazed onto each holding rod 24, in particular if the cathode is to be installed as will be explained with reference to FIGS. 5 to 7.

A holding rod 30 serves to hold the control electrode 12. The control electrode 12 has a hole for the holding rod and is secured entirely similarly to the cathode 10 by means of a threaded pin on the holding rod 30 extending through the hole and a nut screwed onto the threaded pin.

For mechanical retention and for electrical connection of the accelerating electrode 14 and the ion collector electrode 16 there serve corresponding holding rods 32 and 34, respectively. The holding rod 32 for the accelerating electrode extends through a sufficiently wide opening 36 in the ion collector electrode 16.

The holding rods 24, 30 on the one hand and 32, 34, on the other hand, extend axially in opposite directions and are held in each case as shown for the holding rods 32, 34. The mounting according to FIG. 4 includes a clamping spring 38 and a plate-shaped clamping piece 40 which has cylindrical trough-shaped recesses. The holding rods 32, 34 are held between the clamping spring 38 and the clamping piece 40 through the medium of divided bushes 42 of insulating material, e.g. ceramic. The parts 38, 40 are pressed together by a bolt 44 screwed into a threaded bore in the clamping piece 40 and which is fixed by a nut to a base plate 46 carrying the electrode system and preferably consisting of metal. The holding rod 30 is held by a spring plate 31 which is fixed to the base plate by two screws and, similarly to what is shown in FIG. 4, forces the holding rod insulated by an insulating divided bush into a corresponding depression in a clamping piece (not shown). The base plate 46 may have a cutout 48 which ensures free access to the interior of the electrode system also from the holder side and should extend at least over the area between the electrodes 14 and 16.

In a practical embodiment, the distance between the active portion 10a of the cathode 10 and the control electrode 12 was about 1.6 mm; the distance between the electrodes 12 and 14 was about 3.5 to 5 mm and the distance between the electrodes 14 and 16 was about 10 to 20 mm.

The dimensions of the opening in the control electrode were about $2 \times 14$ mm and the length of the active portion 10a of the cathode was about 10 mm.

The accelerating electrode 14 consisted of a 50 micrometres thick molybdenum foil containing in a central area of about $20 \times 12$ mm about forty parallel slits about 0.4 mm wide which were separated by bars about 0.1 mm wide. This molybdenum foil was clamped in a two-part U-shaped frame 15.

Preferred operating voltages are: cathode +70 volts; control electrode +25/+100 volts rectangular voltage; accelerating electrode +250 volts and ion collector electrode −9 volts. The cathode 10 is preferably heated with direct current.

The dimensions of the closed plasma shield, which may consist, for example, of stainless steel sheet, may be about $40 \times 35 \times 20$ mm and the gas inlet opening 20 may be a circular hole with a diameter of from 5 to 10 mm. These values give a response time constant of about 3 to 5 ms.

In the embodiment shown simplified in FIGS. 5 and 6, the supply and holding rods extend transversely of the longitudinal direction of the electrode system, which may be appropriate for reasons of space. The electrode arrangement is mounted on a base plate 146 by means of two holding rods 124 for the cathode 110 and a holding rod 130, 132, and 134, respectively, for the control electrode 112, the accelerating electrode 114 and the ion collector electrode 116. The holding rods are each provided with a threaded pin and a nut screwed onto it, as has been explained with reference to FIG. 3. As is shown more precisely by the example of the holding rod 124 which can be seen in FIG. 5, the fixing of the holding rods to the base plate takes place by means of two nuts 150, 152, which are screwed onto that end 154 of the holding rod in question which is remote from the respective electrode, the end being provided with an external thread. The holding rods extend in each case through a hole 156 (FIG. 6) in the base plate 146 and, if the base plate is not made from an insulating material, such as ceramic, PTFE or the like, are insulated from the base plate by a bush 160 and a washer 158 of insulating material. Each of the electrodes 112, 114, 116 has a lug-like part bent at right angles with a hole for fixing to the associated holding rod, as can be seen from FIG. 5.

FIG. 7 shows in diagrammatic plan view an embodiment of particularly small dimensions of the hot cathode ionization gauge according to the invention. In the embodiment according to FIG. 7, the electrodes are supported by means of the holding rods extending perpendicularly to the axial direction of the electrode system, just as in the embodiment according to FIG. 6. Only the base plate 246, holes 256a for the cathode holding rods, holes 256b, 256c and 256d for a holding rod each for the control electrode 212, the accelerating electrode 214 and the ion collector electrode 216 and also the electrodes 212, 214 and 216 with the associated mounting lugs are shown in FIG. 7 in plan view.

Figure 11:
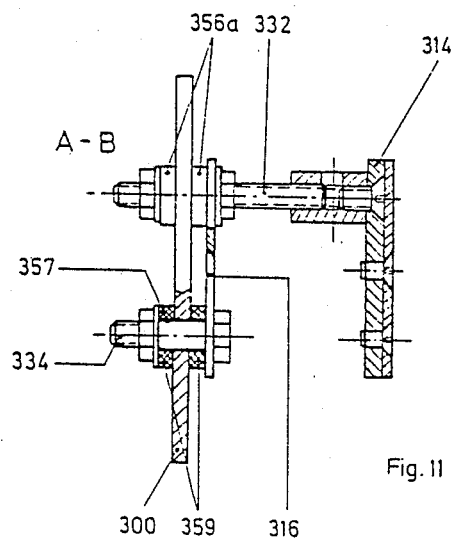
FIG. 11 is a section in a plane A-B in FIG. 9.
Figure 10:
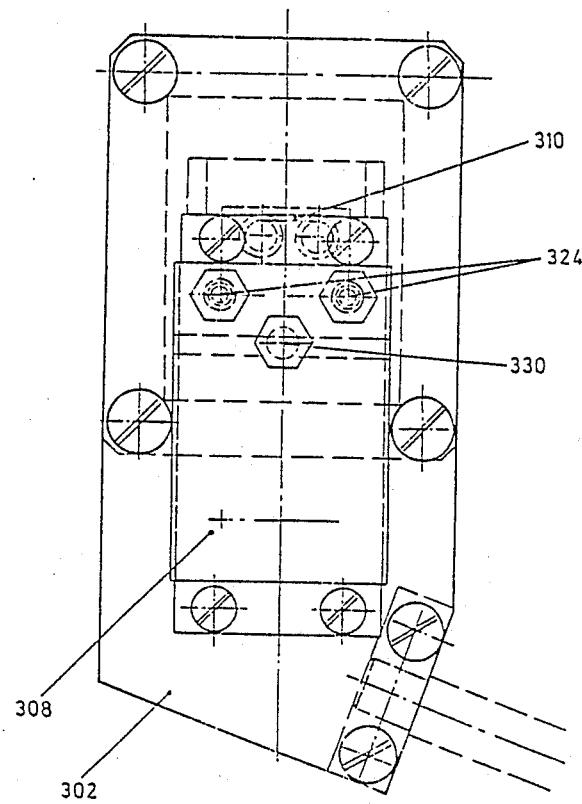
FIG. 10 is a front view of the ionization gauge according to FIG. 9.

In the embodiment of the invention represented in FIGS. 9 to 11, the various electrodes are mounted on two end plates 300, 302 disposed opposite one another in a manner which has been described with reference to FIG. 5. The end plates are held at the intended distance from one another by axially extending supports 304, 306 . . . The cathode 310 is fixed to two holding rods 324 which are secured to the end plate 302 by screw nuts 350, 352 and are insulated with respect to this plate by an insulating arrangement 356 comprising a tubular insulating bush 357 and two insulating washers 359, for example of ceramic. The control electrode 312 is mounted in corresponding manner on the end plate 302 by means of a holding rod 330. The accelerating electrode 314 is mounted on the end plate 300 by means of a holding rod 332 and an insulating arrangement 356a.

The ion collector electrode 316 is also mounted on the end plate 300 in corresponding manner by means of a holding rod 334 and an insulating arrangement. The outer ends of the holding rods 332, 334, which also serve for electrical connection, are surrounded by a shield 318 which is mounted on the outside of the end plate 300. A shield 308 serves for shielding the outer ends of the holding rods 324, 330.

In the embodiments according to FIGS. 3 to 11, the various electrodes may be so formed and dimensioned as has been described for the embodiment of FIG. 3.

The embodiments described can be modified or combined as regards their features in the most diverse manners. For example, the electrodes may be arranged between two end plates, as has been described in connection with FIG. 9, the holding rods, however, may be mounted on the end plates, or on blocks fixed to the end plates, in the manner described with reference to FIG. 3, the holding rods then extending perpendicularly to the axis A along which the electrodes are arranged, similarly to the case of FIG. 5. The control electrode, the accelerating electrode and the ion collector electrode may also be brazed or welded to the associated holding rods.

I claim:

1. A hot cathode ionization pressure gauge with the following electrodes arranged at a mutual distance from one another in the stated sequence along an axis (A):
   (a) a cathode (10) consisting of a tungsten wire at least 0.5 mm thick and which has a middle, active portion (10a),
   (b) a plane control electrode (12) of diaphragm form arranged at a close distance from and parallel to the active portion (10a) of the cathode (10) and having an elongated opening with which the active portion of the cathode is in alignment,
   (c) a plane accelerating electrode (14) arranged at a distance from and parallel to the control electrode (12) and having a series of parallel slit-shaped apertures (22) extending perpendicularly to the longitudinal direction of the active cathode portion (10a), and
   (d) a plane, plate-shaped ion collector electrode (16) parallel to the control electrode (14), the cathode (10) forming on both sides of the active portion (10a) a wire loop which insulates the active portion thermally from the ends of the cathode wire.

2. The ionization pressure gauge according to claim 1, wherein the control electrode has the form of a diaphragm having a hole.

3. The ionization pressure gauge according to claim 2, wherein said hole is a slit whose longitudinal direction extends parallel to the active portion of the cathode.

4. The ionization pressure gauge according to claim 1, wherein the electrodes are supported by holding rods and by a clamping device (38, 40).

5. The ionization pressure gauge according to claim 1, wherein the holding rods (124, 130, 132, 134) extend perpendicularly to the direction of the axis (A) of the electrode system and are fixed in holes (156) in a base plate (146) (FIGS. 5 and 6).

6. The ionization pressure gauge according to claim 1, wherein the accelerating electrode comprises a thin molybdenum sheet which is mounted in a U-shaped frame (15).

7. The ionization pressure gauge according to claim 1, wherein the ends of the cathode wire (10) are each brazed into an axial bore in a holding rod (24) by means of a high-melting brazing material (FIG. 8).

8. A hot cathode ionization pressure gauge with the following electrodes arranged at a mutual distance from one another in the stated sequence along an axis (A):
   (a) a cathode (10) consisting of a tungsten wire at least 0.5 mm thick and which has a middle, active portion (10a),
   (b) a plane control electrode (12) of diaphragm form arranged at a close distance from and parallel to the active portion (10a) of the cathode (10) and having an elongated opening with which the active portion of the cathode is in alignment,
   (c) a plane accelerating electrode (14) arranged at a distance from and parallel to the control electrode (12) and having a series of parallel slit-shaped apertures (22) extending perpendicularly to the longitudinal direction of the active cathode portion (10a), and
   (d) a plane, plate-shaped ion collector electrode (16) parallel to the control electrode (14), the electrodes being supported by holding rods and by a clamping device (38, 40).

9. The ionization pressure gauge according to claim 8, characterized in that the clamping device for each holding rod includes a clamping piece (40) which has a trough-shaped recess accomodating the respective holding rod (FIG. 4).

10. The ionization pressure gauge according to claim 8, characterized in that the clamping device for each holding rod includes a clamping piece (40) which has a trough-shaped recess accomodating the respective holding rod and that the holding rods are insulated by divided insulating bushes (42).

11. A hot cathode ionization pressure gauge with the following electrodes arranged at a mutual distance from one another in the stated sequence along an axis (A):
   (a) a cathode (10) consisting of a tungsten wire at least 0.5 mm thick and which has a middle, active portion (10a),
   (b) a plane control electrode (12) of diaphragm form arranged at a close distance from and parallel to the active portion (10a) of the cathode (10) and having an elongated opening with which the active portion of the cathode is in alignment, (c) a plane accelerating electrode (14) arranged at a distance from and parallel to the control electrode (12) and having a series of parallel slit-shaped apertures (22) extending perpendicularly to the longitudinal direction of the active cathode portion (10a), and (d) a plane, plate-shaped ion collector electrode (16) parallel to the control electrode (14), characterized in that at least one of the electrodes is supported by a holding rod (24, 30, 32, 34) having at one end in each case a threaded pin (26) of reduced diameter forming with the main part of the respective holding rod a shoulder against which the electrode concerned is forced by a screw nut (28) screwed onto the threaded pin, and the holding rods (124, 130, 132, 134) extending perpendicularly to the direction of the axis (A) of the electrode system and being fixed in holes (156) in a base plate (146) (FIGS. 5 and 6).

12. The ionization pressure gauge according to claim 11, characterized in that the holding rods for the cathode and the control electrode are arranged side by side in a first series extending perpendicularly to the direction of the axis (A) and the holding rods for the accelerating electrode and the ion collector electrode are arranged side by side in a second series extending perpendicularly to the direction of the axis (A) and parallel to the first series (FIG. 7).

13. The ionization pressure gauge according to claim 11, characterized in that the control electrode (112), the accelerating electrode (114) and the ion collector electrode (116) each comprise at least one lug extending perpendicularly to the plane of the electrode and which is supported by an associated holding rod (130, 132, 134) (FIG. 5).

14. The ionization pressure gauge according to claim 11, characterized in that the holding rods are insulated in each case from the base plate (146) or end plate (300, 302) by an insulating bush (160).

15. A hot cathode ionization pressure gauge with the following electrodes arranged at a mutual distance from one another in the stated sequence along an axis (A):

(a) a cathode (10) consisting of a tungsten wire at least 0.5 mm thick and which has a middle, active portion (10a), (b) a plane control electrode (12) of diaphragm form arranged at a close distance from and parallel to the active portion (10a) of the cathode (10) and having an elongated opening with which the active portion of the cathode is in alignment, (c) a plane accelerating electrode (14) arranged at a distance from and parallel to the control electrode (12) and having a series of parallel slit-shaped apertures (22) extending perpendicularly to the longitudinal direction of the active cathode portion (10a), and (d) a plane, plate-shaped ion collector electrode (16) parallel to the control electrode (14), the accelerating electrode comprising a thin molybdenum sheet which is mounted in U-shaped frame (15).

16. The ionization pressure gauge according to claim 15, characterized in that the molybdenum sheet has a thickness of about 50 µm and, according to its size, a number of slits in the order of forty slits with a width of about 0.4 mm which are separated by bars about 0.1 mm wide.

17. A hot cathode ionization pressure gauge with the following electrodes arranged at a mutual distance from one another in the stated sequence along an axis (A):

(a) a cathode (10) consisting of a tungsten wire at least 0.5 mm thick and which has a middle, active portion (10a), (b) a plane control electrode (12) of diaphragm form arranged at a close distance from and parallel to the active portion (10a) of the cathode (10) and having an elongated opening with which the active portion of the cathode is in alignment, (c) a plane accelerating electrode (14) arranged at a distance from and parallel to the control electrode (12) and having a series of parallel slit-shaped apertures (22) extending perpendicularly to the longitudinal direction of the active cathode portion (10a), and (d) a plane, plate-shaped ion collector electrode (16) parallel to the control electrode (14), the ends of the cathode wire (10) being each brazed into an axial bore in a holding rod (24) by means of a high-melting brazing material (FIG. 8).

18. The ionization pressure gauge according to claim 17, characterized in that a flange (24a) with a spanner chamfering is welded to each of those ends of the holding rods (24) which are brazed together with the cathode wire (10).

* * * * *